April 3, 1962 R. G. HOOF 3,027,775
ANTI-BACKLASH DRIVE SYSTEM
Filed May 27, 1960
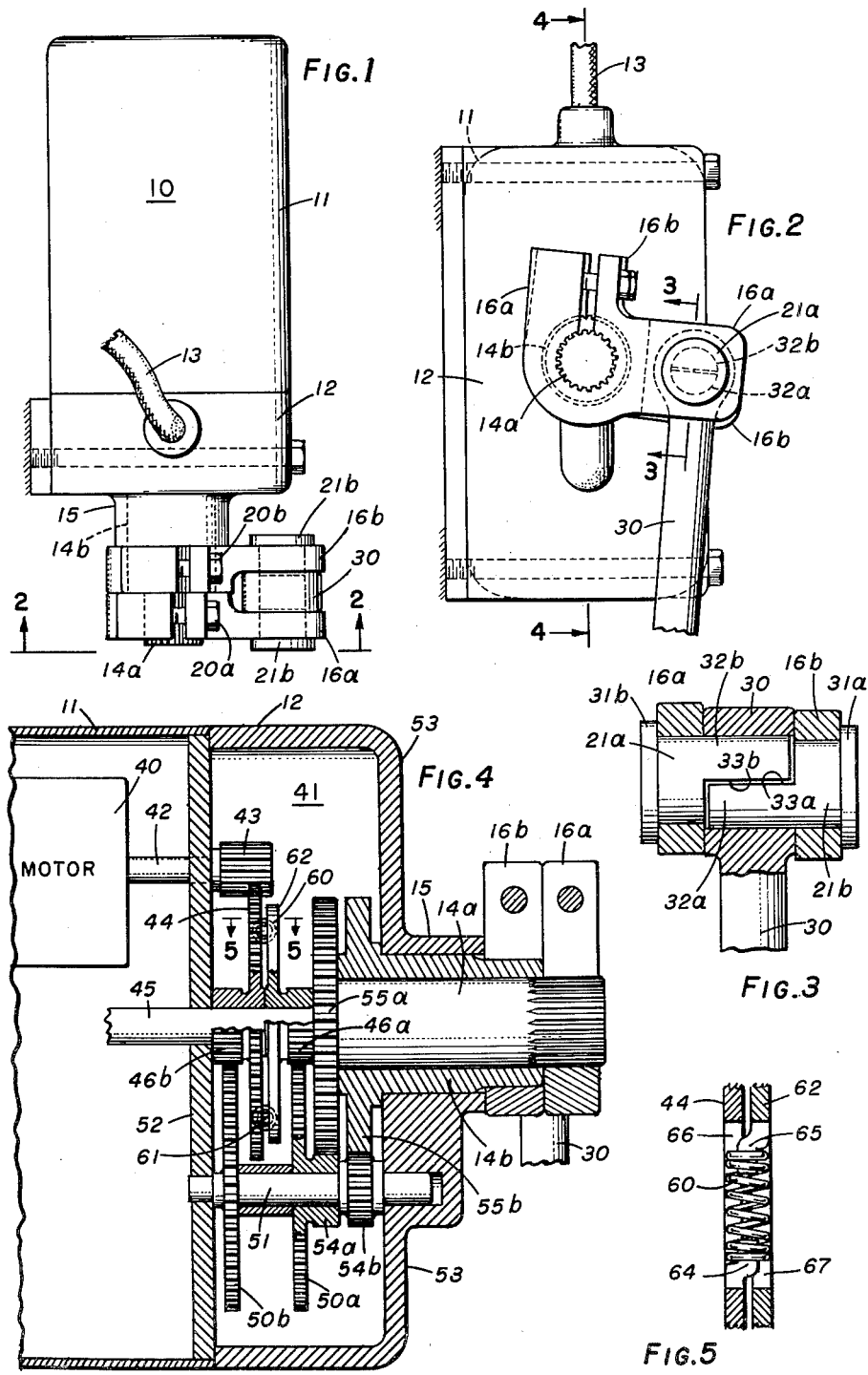

United States Patent Office 3,027,775
Patented Apr. 3, 1962

3,027,775
ANTI-BACKLASH DRIVE SYSTEM
Robert G. Hoof, Glendale, Calif., assignor to The Bendix Corporation, North Hollywood, Calif., a corporation of Delaware
Filed May 27, 1960, Ser. No. 32,401
8 Claims. (Cl. 74—409)

This invention relates to power-driven actuators and more particularly to anti-backlash gear systems for such actuators.

The movement of the control surfaces of flight vehicles such as aircraft and missiles is commonly controlled by a reversible electric motor which, through a gear reduction system, drives an output shaft and arm connected to the control surface. The ultimate positional accuracy of many control surfaces is limited by the amount of backlash or lost motion in the mechanical drive system, which may be substantial in a reduction gear train having several stages, each of which contributes to the total amount of backlash in the system. Further, the driving connection between the output shaft and the link or arm to be driven forms a source of backlash owing to necessary manufacturing tolerances and normal wear.

It is the general object of this invention to eliminate backlash from the gear systems of actuators.

Another object of the invention is to eliminate any backlash between the output of an actuator drive system and its driven member.

Still another object of the invention is to achieve this elimination of backlash from the entire system by means of an anti-backlash system of minimum weight and size.

These objects are all achieved in accordance with the invention, one embodiment of which comprises an actuator including a motor, a reduction gear train, and an output shaft, in which the reduction gear includes in effect two distinct gear systems, the first driven directly by the motor and the second driven by the first gear system, through a resilient connection. The output of each gear system is an arm carrying a semicircular shaft. The two output semicircular shafts together constitute the driving connection to the control surface. The resilient connection between the two gearing systems biases the two semicircular shafts away from each other such that a surrounding bearing surface of a driven member is maintained in constant backlash-free loaded condition at all times.

One feature of the invention is the connection of the dual gear systems such that one is driven by a power source and the second system is driven by the first system with the driven element powered by both systems.

Another feature of the invention is a dual gear system resiliently connected and loaded in opposite directions to eliminate backlash in the entire drive system.

Another feature of the invention is the connection of the two coupled gear systems to halves of a split drive member constituting the output shaft of the actuator.

Still another feature of the invention is the position of the resilient connection between the first gears of both gearing systems whereby the source of load for elimination of backlash is located in the low-torque portion of the gearing systems, and the size and weight of the resilient load producing element are therefore minimized.

A full understanding of the invention may be had from the following detailed description with reference to the drawing in which:

FIG. 1 is a top view of an actuator incorporating this invention;

FIG. 2 is a side view of the actuator of FIG. 1;

FIG. 3 is an enlarged fragmentary sectional view of the split shaft or pin-arm assembly of this invention taken along line 3—3 of FIG. 2;

FIG. 4 is a vertical section through the gear and motor housings of the actuator of FIGS. 1 and 2 taken along line 4—4 of FIG. 2; and FIG. 5 is a fragmentary sectional view along the line 5—5 of FIG. 4.

Referring now to FIG. 1 an actuator assembly 10 comprises a motor and clutch housing 11 with a gear box 12 at one side and a power cord 13 entering at the top of gear box 12. A pair of coaxial output shafts 14a and 14b extend out of the gear box. The outer hollow shaft 14b is indicated by the dashed lines in the throat portion 15 of gear box 12. The inner solid shaft 14a extends out beyond the end of hollow shaft 14b and has an arm 16a secured thereto by a clamping screw 20a. The shaft 14b has an arm 16b secured thereto by a clamping screw 20b. The arms 16a and 16b carry respective pins 21a and 21b having semi-cylindrical, mating inner end regions 32a and 32b respectively, as may be better seen in FIG. 3. The arms 16a and 16b and the pins 21a and 21b form a yoke and pin assembly for applying force to a control link 30.

The use of the same number with the suffixes a and b respectively, identify the comparable elements in the two distinct gear and actuator arm systems hereinafter described. The elements with the same number and a and b suffixes, in normal operation of the device, move in the same direction and are displaced from each other by only the amount of the backlash in the system.

In the side view of the actuator assembly 10 shown in FIG. 2, the driving connection between the arms 16a and 16b and the driven link 30 having an inner bearing surface surrounding the pins 21a and 21b may be seen. The link 30 is in a position to receive thrust along a generally vertical line in the drawing in response to rotation of the arms 16a and 16b. A slight clockwise displacement of arm 16b with respect to arm 16a appears in FIG. 2. This displacement is due to the mechanical load applied through the gear system, as hereinafter described, between the arms 16a and 16b such that the pins 21a and 21b bear against the opposite sides of the bearing surface in the arm 30.

In FIG. 3, the configuration of the split pin elements 21a and 21b may be seen as including full round heads 31a and 31b respectively, and half-round pin-portions 32a and 32b. The pins 21a and 21b have juxtaposed flat surfaces 33a and 33b. The pin portions 32a and 32b are preferably semicircular and of the same radius so that they have the same configuration as a solid pin with heads at either end, but allow displacement of the portions 32a and 32b from each other to eliminate any play between the bearing surfaces of the pins and the surrounding bearing surface of link 30.

The gear train, including the mechanism for urging the two pins apart, appears in FIG. 4. A reversible motor 40 is shown coupled to the gear system designated generally as 41 within the gear box 12. The motor 40 drives a shaft 42 carrying a pinion 43. The pinion 43 drives a gear 44 mounted for free rotation on an extension 45 of shaft 14a. The gear 44 carries an integral pinion 46b meshing with gear 50b secured to a shaft 51 journaled in the back wall 52 and the front wall 53 of gear box 12. The shaft 51 carries a pinion 54b which drives a gear 55b integral with the shaft 14b. The shaft 14b may be seen clearly in FIG. 4 as being hollow and surrounding the shaft 14a.

Coupled to gear 44 by a resilient connection in the form of springs 60 and 61 is a disk 62 carrying a pinion 46a, the counterpart of pinion 46b of gear 44. The disk 62, is driven solely by gear 44 through the coupling springs 60 and 61. The pinion 46a is rotatably mounted on the extension 45 of shaft 14a. Meshing with the pinion 46a is a gear 50a including an integral pinion 54a rotatably mounted on shaft 51. Engaging pinion 54a is a gear 55a integral with shaft 14a.

It may therefore be seen from FIG. 4 that the gear system includes two separate gear trains driving individual arms 16a and 16b. The two gear systems derive power from the common source, to wit, motor 40 and its pinion 43. Both the gear trains transmit torque from the pinion 43 to the respective arms 16a and 16b, but both are displaced from each other an amount which is a function of the backlash of the gearing system from gear 44 on through to the arms 16a and 16b, as well as the amount of backlash or play between the pins 21a and 21b and their driven member 30 of FIG. 2.

The specific arrangement of the resilient connection comprising springs 60 and 61 of FIG. 4 is shown in FIG. 5. Gear 44 includes a slot 66 extending at a right angle to a gear diameter, and disk 62 includes a matching slot 67. Compressed within the pair of slots is a spring 60 tending to mechanically bias the gear 44 and disk 62 in opposite directions. The spring 60 encircles tabs 64 and 65 at opposite ends of slots 66 and 67 in gear 44 and disk 62 respectively to hold the spring 60 in place. One or more of the springs 60 and 61 may be employed. The spring constants of springs 60 and 61 are comparatively small, since this resilient connection between the two gear trains is positioned at the low-torque (high-speed) end of the system. The spring-loaded connection of disk 62 to gear 44 applies a mechanical loading to the entire gear system and between the arms 16a and 16b. Backlash throughout the entire gear system and the connection between the pin assembly 21 and the driven member 30 is thereby eliminated. This is accomplished without mechanical loss except for the increase in friction between the meshing gear surfaces and between the pins 31a, 31b and the link bearing. There is a constant internal or "caged" load in the dual gear systems through to the pins 21a and 21b and the driven arm 30. This "caged" load is not seen by either the motor or the driven control surface, since it is balanced out within the drive system. The amount of caged or internal load supplied by springs 60 and 61 may be varied to suit the particular installations. Heavy loading will eliminate backlash over the entire power range of the actuator. Low loading will protect against backlash at the lower range where flutter is most prevalent with negligible increase in gear losses. In either case the resilient connection, springs 60 and 61, between the gear 44 and the disk 62 need only be relatively small in size because of the low torque level at that point in the gear system. Therefore, the weight and size increase due to the presence of the resilient connection of anti-backlash mechaanism is reduced.

Although for the purpose of explaining the invention a particular embodiment thereof has been shown and described, obvious modifications will occur to a person skilled in the art, and I do not desire to be limited to the exact details shown and described.

I claim:

1. An anti-backlash drive system comprising a first gear train, a second gear train, a spring element coupling said first gear train to said second gear train for introducing displacement between said first and second gear trains, means for introducing torque into said first gear train to drive said first and second gear trains, and means connecting the output of said first and second gear trains to a common driven member whereby displacement introduced between said first and second gear trains by said spring element is conducted through said first and second gear trains to said common driven member to eliminate backlash between said gear trains and said driven member, said connecting means comprising a pair of output arms coupled to the respective first and second gear trains, and individual pin means secured to the respective output arms, said individual pin means being shifted with respect to each other by said spring element to positively engage said driven member.

2. An anti-backlash drive system comprising a first train of speed reducing gears, a second train of speed reducing gears, means driving said second train of gears from said first train of gears, an output arm connected to said first train of gears, an output arm connected to said second train of gears, a pair of mating pins secured to respective output arms and a common driven member operatively connected to both said pins, said means driving said second gear train comprising a resilient connection between said first and second gear train introducing mechanical loading between said first and second gear trains in directions such that said pins are loaded against opposite sides of the connection to said driven member.

3. The combination in accordance with claim 2, wherein said first gear train includes a first gear and said second gear train includes a rotatable member in juxtaposition to said first gear and said means driving said second gear train comprises a spring member restrained between said first gear and said rotatable member urging said gear and member in opposite directions around a common axis.

4. The combination in accordance with claim 2 wherein said first and second gear trains include coaxially arranged output shafts and the innermost output shaft extends beyond the end of the outermost shaft, and the output arms of said first and second gear trains are positioned in side-by-side relationship for rotation by respective output shafts forming a yoke with said pins extending therebetween.

5. An anti-backlash drive system comprising a first reduction gear train, a second reduction gear train, resilient means at the input end of said first reduction gear train coupling said second gear train to be driven by said first gear train, an output torque arm coupled to said first gear train, an output torque arm coupled to said second gear train, a driven member mounted for substantial lineal displacement, means independently coupling said torque arms of said first and second gear train to said driven member whereby relative displacement of said first and second gear trains introduced by said resilient means is transmitted through said gear trains without simultaneous loading on opposite faces of any of the members of said first and second gear trains, said coupling means introducing a displacing force from said respective first and second gear trains acting upon said driven member in opposite directions to eliminate backlash in said gear trains and between said coupling means and the driven member.

6. The combination in accordance with claim 5 wherein said coupling means between the output arms and said driven member limits the displacement of said arms induced by said resilient means.

7. The combination in accordance with claim 5 wherein said driven member includes portions limiting the displacement of said output arms induced by said resilient means whereby said driven member is free of backlash from both the gear system and the coupling of the driven member to the gear system.

8. An anti-backlash drive system comprising a first gear train, a second gear train, resilient means coupling said second gear train to be driven by said first gear train, a first output torque arm coupled to said first gear train, a second output torque arm coupled to said second gear train, a common driven member, means coupling the output torque arms of said first and second gear trains to said common driven member, said coupling means comprising a first pin secured to said first arm, a second pin secured to said second arm, said first and second pins including mating surfaces and semicircular bearing surfaces whereby said pins, when positioned in mating relationship, present a substantially cylindrical bearing surface engaging said driven member and whereby said resilient means causes said first and second gear trains to displace said pins from mating position and into positive engagement with said driven member.

References Cited in the file of this patent

UNITED STATES PATENTS

| | | |
|---|---|---|
| 2,283,606 | Lewis | May 19, 1942 |
| 2,444,734 | Gillett | July 6, 1948 |
| 2,737,056 | Baumgartner | Mar. 6, 1956 |
| 2,905,007 | Carlsen | Sept. 22, 1959 |